United States Patent
Munz et al.

(10) Patent No.: US 7,819,017 B2
(45) Date of Patent: Oct. 26, 2010

(54) DYNAMOMETER ELEMENT

(75) Inventors: Michael Munz, Ruetlingen (DE); Anton Dukart, Gerlingen (DE); Helmut Grutzeck, Maehringen (DE); Conrad Haeussermann, Sonnenbuehl (DE); Klaus Kasten, Reutlingen (DE); Uwe Schiller, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 10/563,443

(22) PCT Filed: Jul. 7, 2004

(86) PCT No.: PCT/DE2004/001454

§ 371 (c)(1),
(2), (4) Date: Mar. 19, 2008

(87) PCT Pub. No.: WO2006/005273

PCT Pub. Date: Jan. 19, 2006

(65) Prior Publication Data

US 2008/0202225 A1 Aug. 28, 2008

(51) Int. Cl.
*F16B 31/02* (2006.01)
(52) U.S. Cl. ........................................................ 73/761
(58) Field of Classification Search .................. 73/760, 73/761, 763
See application file for complete search history.

(56) References Cited

U.S. PATENT DOCUMENTS

| | | | | |
|---|---|---|---|---|
| 3,812,758 A | * | 5/1974 | Bossler, Jr. | 411/14 |
| 4,823,606 A | * | 4/1989 | Malicki | 73/761 |
| 5,094,109 A | * | 3/1992 | Dean et al. | 73/718 |
| 6,545,556 B2 | * | 4/2003 | Raffalt et al. | 331/158 |
| 2002/0014117 A1 | * | 2/2002 | Raffalt et al. | 73/290 V |
| 2007/0234811 A1 | * | 10/2007 | Fehrenbach et al. | 73/649 |
| 2008/0047353 A1 | * | 2/2008 | Clark | 73/761 |

FOREIGN PATENT DOCUMENTS

| | | |
|---|---|---|
| DE | 199 60 786 | 6/2001 |
| DE | 100 12 983 | 10/2001 |
| JP | 56-87195 | 7/1981 |
| JP | 60-239630 | 11/1985 |
| JP | 61-184930 | 8/1986 |
| JP | 1-253622 | 10/1989 |
| WO | WO 00/16054 | 3/2000 |

OTHER PUBLICATIONS

English Language Translation of Abstract of DE 199 60 786.
English Language Translation of Abstract of WO 00/16054.
English Language Translation of Abstract of DE 100 12 983.

* cited by examiner

*Primary Examiner*—Eric S McCall
(74) *Attorney, Agent, or Firm*—Kenyon & Kenyon LLP

(57) ABSTRACT

A dynamometer element including a bolt on which a diaphragm is mounted, the diaphragm being surrounded by a sleeve, to which a force component to be measured is applied perpendicularly to the longitudinal direction of the bolt, the sleeve being spaced from the bolt in such a way that the diaphragm is strained as a function of the force component, a sensor system for measuring the strain being provided on the diaphragm.

23 Claims, 6 Drawing Sheets

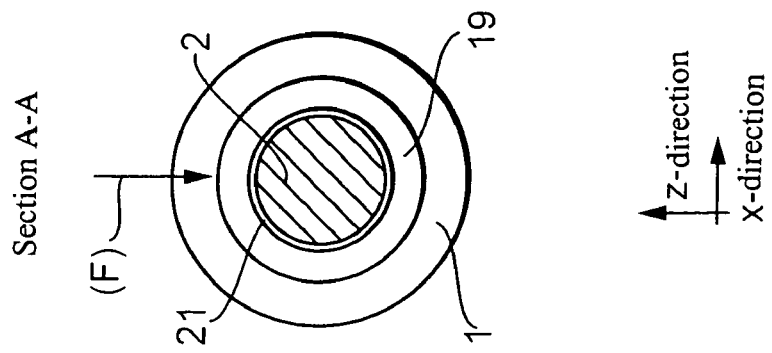
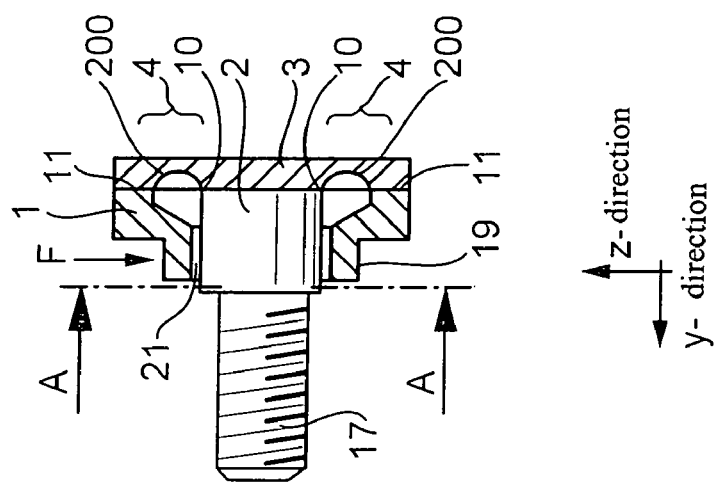
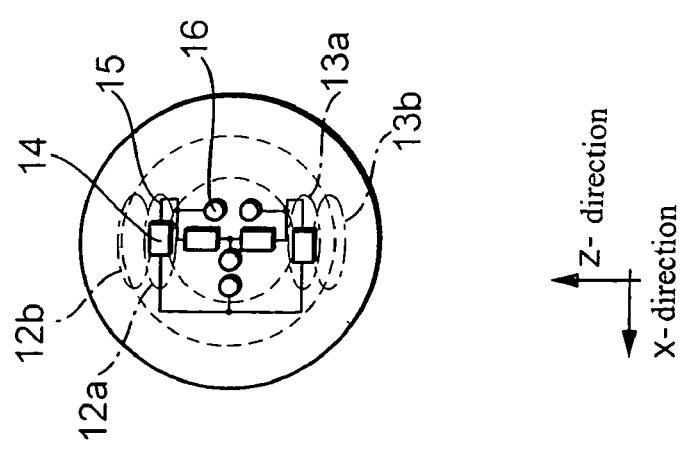
Fig. 1c
Fig. 1b
Fig. 1a

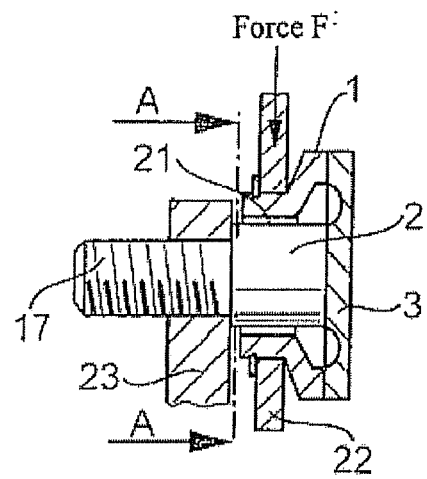
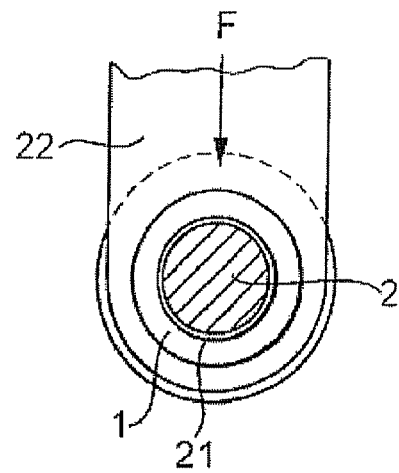
Fig. 2a
Fig. 2b
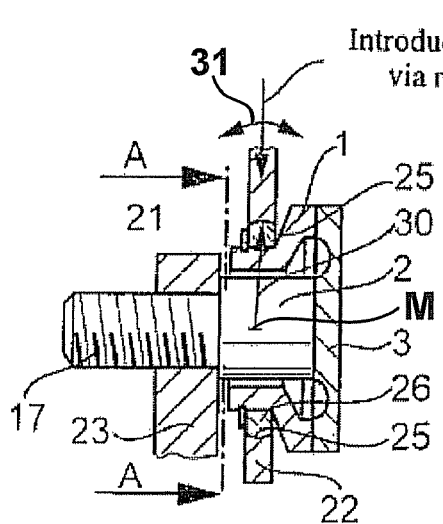
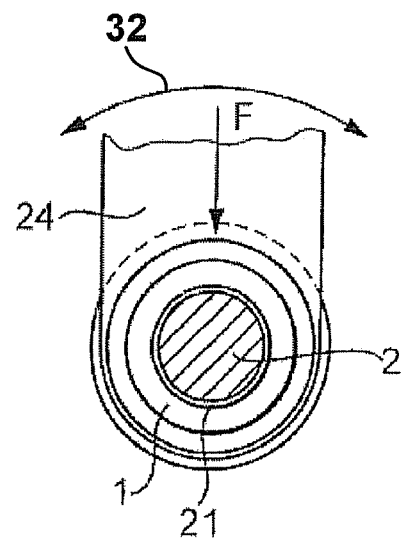
Fig. 3a
Fig. 3b

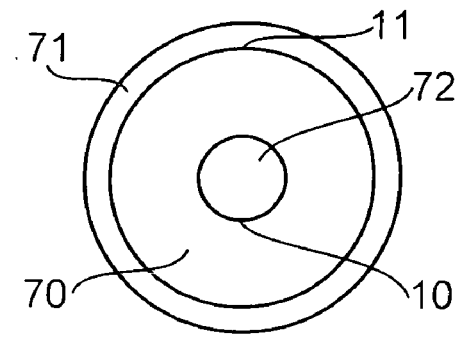
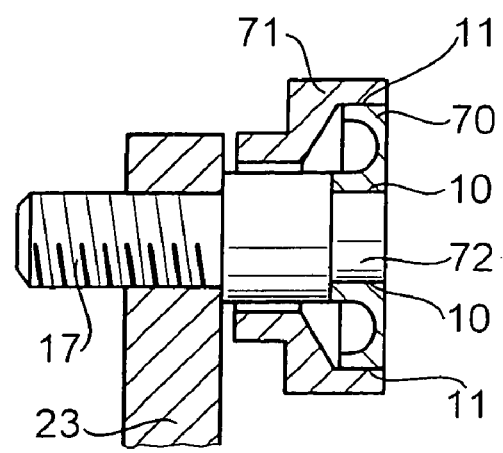
Fig. 7a          Fig. 7b
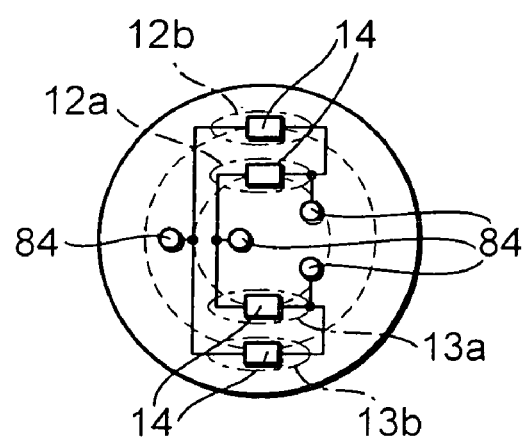
Fig. 8
↑ Z- coordinate ↑ z- coordinate ↑ z- coordinate

DYNAMOMETER ELEMENT

FIELD OF THE INVENTION

The present invention is directed to a dynamometer element

BACKGROUND INFORMATION

A force-moment sensor, in which three dynamometer tubes are arranged at a 120° angle to one another, is known from German Published Patent Application No. 100 12 983. The end of each dynamometer tube facing the center of the housing is fixedly connected to the housing bottom. The other free end of each dynamometer tube accommodates a threaded bolt, which is inserted into the side wall of the housing cover. Only forces perpendicular to the dynamometer tubes can be transmitted. Near their fixedly mounted ends, the dynamometer tubes are provided with two perpendicular cross bore holes, which reduce the tube cross section to four webs. Strain gauges are attached there for measuring the magnitude and direction of the transverse force transmitted to the dynamometer tube, two strain gauges opposite one another measuring one component of this transverse force. The resulting load acting from the outside, composed of three force components and three moment components, is computable via the total of six bearing force components thus determined.

SUMMARY OF THE INVENTION

The dynamometer element according to the present invention has the advantage over the related art that a considerably simpler construction is used for measuring the force. The dynamometer element is easy to mass-produce and easy to use, for example, in seats for weight measurement. However, the dynamometer element is also usable in other devices for measuring forces. The dynamometer element according to the present invention also allows moment measurement, the dynamometer element being able to be a screw or a bolt, thus requiring minimum space.

A diaphragm held in the center by a bolt and surrounded by a sleeve from the outside is used as the principle of force measurement. The sleeve is configured in such a way that it protects the force sensor from overload. Another advantage is that only a small sealing surface, i.e., the gap between the sleeve and the bolt or screw, is required. It is essential that there are high-strain areas on the diaphragm, where a sensor system for measuring the strain is mounted, the strain being a measure of the force. These high-strain areas should preferably be made of a high-strength material, such as a high-strength steel, while the remaining elements may be made of a lower-strength material. Ideally the force should be applied to the sleeve in such a way that the direction of force is perpendicular to the bolt. It is, however, possible to apply the force to the sleeve at a different angle, the dynamometer element according to the present invention then essentially measuring the force component which is perpendicular to the bolt and essentially causes the diaphragm to expand.

The sensor system for measuring the strain is particularly simple to apply or deposit, because it is located in a single plane. Thus, thin-film methods may also be used for applying the strain-measuring sensor system. The strain-measuring sensor system may have a plurality of strain-measuring elements.

It is particularly advantageous that the dynamometer element according to the present invention may be designed as a single piece. This makes the dynamometer element according to the present invention particularly simple to manufacture. In particular, the dynamometer element may have an axially symmetric design, slight deviations from the axial symmetry having no effect on the function of the dynamometer element. The dynamometer element according to the present invention is preferably designed as a screw. This makes a particularly simple installation of the dynamometer element possible in different applications, for example, for measuring the weight force applied to a vehicle seat.

It is advantageous that the strain-measuring sensor system has strain-measuring strips which are preferably connected to form a Wheatstone bridge to permit precise measurement. Alternatively, it is possible for the sensor system to have piezoresistive elements for measuring the strain via the piezoresistive defect. These elements may be applied to the diaphragm of the dynamometer element by a thin-film method.

In a refinement, a rocker is used for applying the force. This permits a precise application of force. The rocker is mechanically linked to the sleeve.

Furthermore, a ball socket may be provided between a rocker and the dynamometer element to achieve decoupling of the moments in the X, Y, and Z directions. If the rocker is used and the dynamometer element is securely mounted for dissipating the force, then some or all moments may be decoupled from the dynamometer element. A ring for limiting the force may be provided in the gap between the sleeve and the bolt.

Instead of manufacturing the dynamometer element according to the present invention in one piece, the sleeve, bolt, and diaphragm may be connected via joints. Welding may be used, for example, as the joining method. It is possible, in particular, to use different materials for the sleeve, diaphragm, and bolt. The manufacturing method may thus also be further simplified. The joints are easily accessible and therefore permit the components to be easily connected. The joints between the sleeve and the diaphragm, as well as between the diaphragm and the bolt, may be offset with respect to one another. This permits the manufacture of the dynamometer element according to the present invention to be further simplified.

It is furthermore advantageous that the dynamometer element has inward-pointing free spaces due to an appropriate configuration of the bolt, the diaphragm, and the sleeve to achieve a better and more sensitive configuration of the high-strain areas on the diaphragm. This makes a larger displacement possible in the expansion as a function of the force and therefore a better force measurement.

The diaphragm element may advantageously have a simple annular design and thus be situated only in the high-strain areas, thereby saving on the high-strength materials.

Finally, the joints may also have an annular design, resulting in a particularly simple manufacture of the dynamometer element according to the present invention. The annular diaphragm is then used.

BRIEF DESCRIPTION OF THE DRAWINGS

FIG. 1a shows a front view of the dynamometer element according to the present invention.

FIG. 1b shows a sectional side view.

FIG. 1c shows a section of the dynamometer element according to the present invention.

FIG. 2a shows a lateral section of the installed dynamometer element.

FIG. 2b shows a section of the dynamometer element.

FIG. 3a shows a dynamometer element having a ball socket.

FIG. 3b shows the corresponding section of the dynamometer element.

FIG. 7a shows a top view.

FIG. 7b shows a fourth sectional side view.

FIG. 8 shows another front view featuring a variation of the strain-measuring elements.

DETAILED DESCRIPTION

Figure 4:
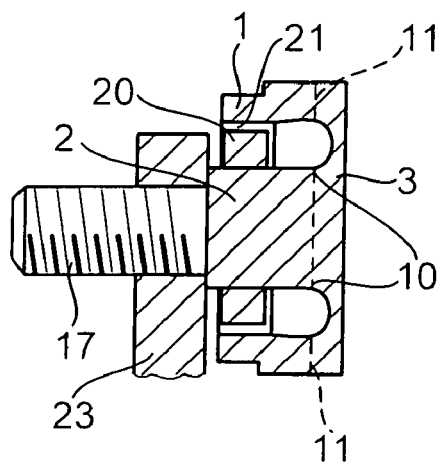
FIG. 4 shows a sectional side view.

Known force sensors use S-shaped or rod-shaped elements which deform under the effect of a force or a moment. The disadvantage of these shapes is the large installation space required and the difficulty of integrating them into existing fasteners such as screws or bolts.

The present invention provides a dynamometer element which allows a force and/or moment measurement using a specially designed screw or bolt possible. The dynamometer element is made out of simple geometric elements which are easily manufactured and require minimum space for installation.

Because the dynamometer element measures the force via the strain, the placement of the strain-measuring sensor system ensures that essentially only forces in one direction are able to be sensed.

The basic structure of the dynamometer element is shown in FIGS. 1a and b. The dynamometer element has essentially axially symmetric parts; slight deviations from the axial symmetry do not affect their function. FIG. 1a shows a front view of the dynamometer element. Only diaphragm 3, applied, strain-dependent resistors 14, conductors 15 connecting the resistors, and electric terminals 16 are visible in the front view. Some of strain-dependent resistors 14 are situated in an area 12a subjected to tensile stress when under load. Other resistors are situated in an area 13a subjected to compressive stress when under load. Area 12a is the tensile stress area, while area 13a is the compressive stress area, when the force acts in indicated direction F. If force F acts in the opposite direction from the one indicated, tension changes into compression and compression changes into tension. In each instance a resistor is used for measuring the strains resulting from the stress. Two further resistors, placed in a less strain-intensive area on diaphragm 3, are situated between these two areas. This makes it possible to achieve a very precise measurement by connecting these resistors 14 in a Wheatstone bridge and analyzing the voltage differential. Other bridge or analyzer circuits are also possible. Electric terminals 16 are connected to analyzer circuits, such as a microcomputer. This microcomputer may be situated in a motor vehicle, preferably in a control unit. In FIGS. 1a, b, and c, the coordinate systems on the bottom indicate the direction. This is also true for FIGS. 2a, 2b, 3a, 3b, and 8.

FIG. 1b shows a sectional side view of the dynamometer element according to the present invention. The dynamometer element has a bolt which connects a threaded part 17 to diaphragm 3. Diaphragm 3 has a larger diameter than bolt 2 and its outer area is connected to a sleeve 1 which, like diaphragm 3, bolt 2, and threaded part 17, is rotationally symmetric. The outer third of diaphragm 3 has recesses 200, which define strain-intensive areas 4. Sleeve 1 in this case has a shoulder 19 to which force F is applied perpendicularly to the longitudinal direction of bolt 2, i.e., threaded part 17. A clearance 21 is defined between sleeve 1 and bolt 2; this clearance is reduced by the application of force F, so that strain-intensive areas 4 are under compressive or tensile stress. Sleeve 1 and diaphragm 3 are interconnected by a joint 11. Diaphragm 3 and bolt 2 are interconnected by a joint 10. Welding may be used, for example, as a joining method.

FIG. 1c shows a section of the dynamometer element at marked location A, so that the section goes through bolt 2, but does not cut through sleeve 1. Thus bolt 2, clearance 21, and sleeve 1 may be seen in section A-A in FIG. 1c. Sleeve 1 also has shoulder 19, which is defined by the additional internal circle.

Force F is applied to sleeve 1 via shoulder 19. This generates a moment in the dynamometer element. This moment acts between sleeve 1 and bolt 2, upon diaphragm 3, which is located between them and is deformed by the moment application. Strain or stress-measuring elements, such as strain gauges, piezoresistive structures, or thin-film structures, are mounted on the high-strain, annular part of diaphragm 4.

Figure 9:
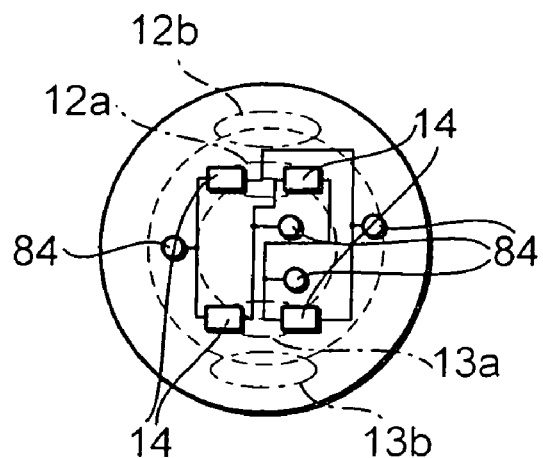
FIG. 9 shows another front view featuring a further variation of the strain-measuring elements.
Figure 10:
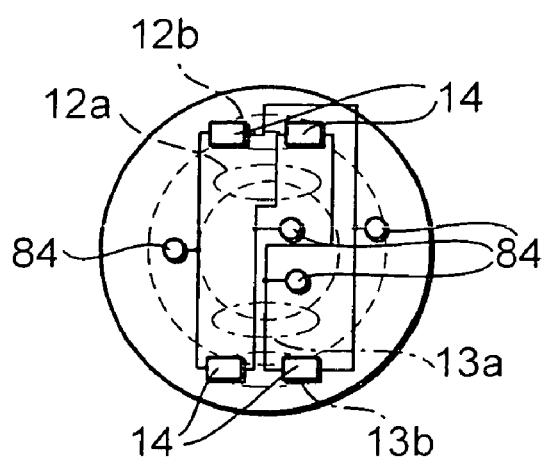
FIG. 10 shows another front view featuring a further variation of the strain-measuring elements.

FIGS. 8, 9, and 10 show variations of the configuration of the strain-measuring elements. The advantage of these configurations is the change in the resistance of all four resistors. Two resistors are located in an area under tensile stress; the other two in an area under compressive stress.

FIG. 8 shows strain-measuring elements which are located on the edge of the thin-walled diaphragm area. Resistors 14 in areas 12a, 13b are under tensile stress if the load is applied in the negative Z direction. Resistors 14 in areas 12b, 13a are under compressive stress in this case. Terminals 84 lead to the measurement analyzer element. Also in this case, strain-dependent resistors 12a, 12b, 13a, 13b are connected in a Wheatstone bridge.

FIG. 9 shows a further variation, which utilizes only areas 12a and 13a. In this case resistors 14 are positioned in such a way that a force in the negative Z direction results in a tensile stress in area 12a and a compression stress in area 13a.

A similar configuration is also possible with areas 12b and 13b. This is shown in FIG. 10. In this case, resistors 14 are positioned in such a way that a force in the negative Z direction results in a compression stress in area 12b and a tensile stress in area 13b.

Figure 11:
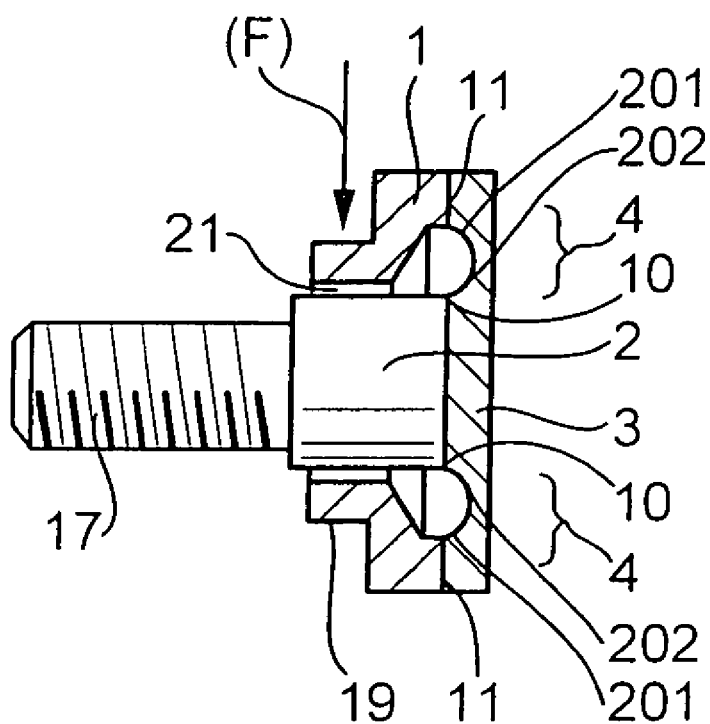
FIG. 11 shows a fifth sectional side view.
Figure 11:
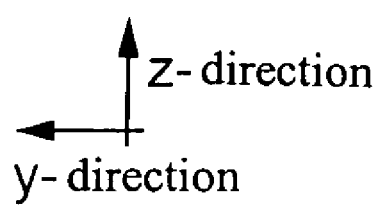

Recess 200 may have a circular design. The radius of this circle may be uniform throughout. FIG. 11 shows a variation. Also in this case, bolt 2 is connected to sleeve 1 via diaphragm 3. To optimize the measuring signal, the portion of a circle segment 202 pointing at bolt 2 may have a different, preferably greater, radius than the portion of circle segment 201 pointing at sleeve 1. This configuration makes it possible for the above-shown configurations of the strain-measuring elements to adjust the strain distribution in such a way that the measuring signal of the strain-measuring elements responds to the application of force F with maximum sensitivity. The circle segments may also be approximated or optimized by parabolic, spline, or other functions.

The force may then be dissipated via a fixed restraint.

This is shown in FIG. 2. Elements described in FIG. 1 are identified here with the same reference numerals. A fixed restraint 23 is shown here, which may be implemented, for example, by screwing threaded part 17 into a thread. In addition, FIG. 2a, which also shows an additional sectional side view of the dynamometer element (FIG. 2b), shows a rocker 22, which is used for introducing the force. The force is thus introduced here via rocker 22 and dissipated via fixed restraint 23. In principle, restraint 23 and rocker 22 may be interchanged. The rocker decouples the moments around the Y axis from the dynamometer element.

FIG. 2b again shows a section of the dynamometer element at location a as indicated, sleeve 1 having shoulder 19 and rocker 22 being visible here in addition to bolt 2 and clearance 21.

FIG. 3 again shows a sectional side view of the dynamometer element, the same parts being again identified using the same reference numerals. However, in this case a redesigned rocker 24 and sleeve 1 are used. The sleeve may have a clearance 21, to provide rocker 24 with the needed play in the direction of rotation 31.

Direction of rotation 31, 32 in FIGS. 3a and 3b for moment decoupling in all spatial axes is made possible by ball sockets 25 on rocker 24, for example. The ball socket may have two engaging elements which each have a spherical surface 25 with the same center M and the same radius 30 as shown in FIG. 3a. The spherical surface of rocker 24 points inward (to center M); the spherical surface of bearing 26 points outward, away from center M. The two surfaces may have a slight play with respect to one another to provide for the rotary motion.

FIG. 3b again shows a section at location A as indicated, only bolt 2 being sectioned, and a front view of sleeve 1 of rocker 24, which is to ball socket 25 movably about the X, Y, and Z axes.

In general, when the force is applied to the dynamometer element via intermediary elements, the moments may be decoupled if these intermediary elements are configured as an articulated joint.

FIG. 4 shows an additional sectional side view. Threaded part 17 is again screwed into fixed restraint 23; bolt 2 is connected to diaphragm 3 via joint 10, and diaphragm 3 is connected to sleeve 1 via joints 11. A spacer ring 20 used as a force limiter is additionally mounted on bolt 2. If distance 21 is reduced to 0 due to the force applied to sleeve 1, i.e., sleeve 1 comes into contact with spacer ring 20, then the force is limited because no further force causing further strain may be applied. This function is implemented in the remaining figures via appropriately selected dimensions. This embodiment is characterized by the fact that joints 10 and 11 may be omitted and the dynamometer element may be manufactured from one piece. This is possible because prior to applying the spacer ring, inner space 63 is easily accessible for machining.

Figure 5:
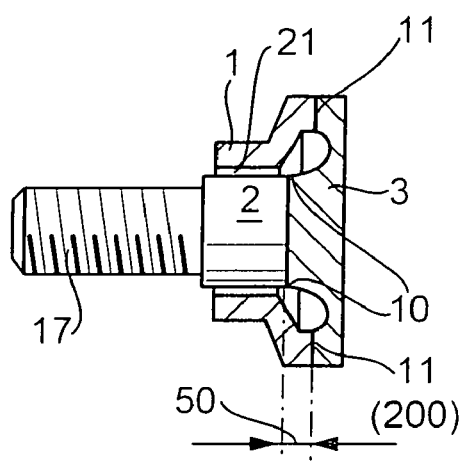
FIG. 5 shows a second sectional side view

FIG. 5 shows an additional sectional side view. Joints 11 and joints 10 are no longer in one plane as in FIG. 4, but are offset with respect to one another. Offset 50 allows the dynamometer element according to the present invention to be manufactured more effectively.

Figure 6:
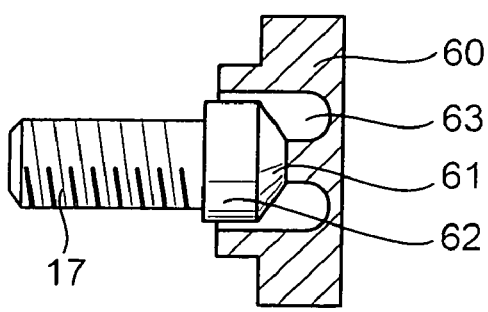
FIG. 6 shows a third sectional side view.

FIG. 6 shows the dynamometer element having a single-piece diaphragm and sleeve 60, which, like bolt 62 having bevel 61, are shaped in such a way that clearances 63 for the manufacture of the high-strain areas are shaped inward. Joints 10 and 11 are used again for connecting bolt 1, diaphragm 60, and bolt 62.

FIG. 7a shows another exemplary embodiment of the dynamometer element according to the present invention. In this case, two annular joints 10 and 11 are provided, which make it possible for diaphragm 70 to have an annular shape. Therefore bolt 72 can be seen at the upper surface, as can and annular sleeve 71 as well. This makes economical use of the material used for diaphragm 70, i.e., a high-strength steel, possible. FIG. 7b shows a sectional side view of this exemplary embodiment. It shows that the dynamometer element having annular diaphragm 70, and threaded part 17 is situated in a fixed restraint 23.

What is claimed is:

1. A dynamometer element, comprising:
    a bolt on which the diaphragm is mounted;
    a sleeve to which an outer area of the diaphragm is connected, and to which a force component to be measured is applied perpendicularly to a longitudinal axis of the bolt, the sleeve being spaced from the bolt such that the diaphragm is strained as a function of the force component; and
    a sensor system for measuring the strain, the sensor system being arranged on the diaphragm.

2. The dynamometer element of claim 1, wherein a one-piece component includes the bolt, diaphragm, and sleeve.

3. The dynamometer element of claim 1, wherein the dynamometer element forms a screw.

4. The dynamometer element of claim 1, wherein the sensor system includes strain gauges for measuring the strain.

5. The dynamometer element of claim 1, wherein the sensor system includes piezoresistive elements for measuring the strain.

6. The dynamometer element of claim 1, wherein the sensor system is applied using thin-film technology.

7. The dynamometer element of claim 1, wherein the sensor system includes a Wheatstone bridge circuit.

8. The dynamometer element of claim 7, wherein the Wheatstone bridge has two resistors in an area under compressive stress and two further resistors in an area under tensile stress.

9. The dynamometer element of claim 7, wherein the Wheatstone bridge has a first resistor in an area under compressive stress, a second resistor in an area under tensile stress, and two further resistors in a low-strain area.

10. The dynamometer element of claim 1, further comprising:
    a rocker for introducing the force component.

11. The dynamometer element of claim 10, wherein the rocker includes a ball socket for decoupling moments.

12. The dynamometer element of claim 1, further comprising:
    a spacer ring arranged on the bolt for limiting the force.

13. The dynamometer element of claim 1, wherein at least one joint is provided in the dynamometer element for connection.

14. The dynamometer element of claim 13, wherein the at least one joint includes a first joint connecting the diaphragm to the sleeve and a second joint connecting the diaphragm to the bolt, and the first and second joints are offset from each other with respect to the longitudinal axis of the bolt.

15. The dynamometer element of claim 1, wherein the diaphragm includes inward-pointing free spaces which define strain-sensitive areas.

16. The dynamometer element of claim 15, wherein the free spaces are circular recesses.

17. The dynamometer element of claim 16, wherein each of the recesses includes a respective first circle segment terminating at the sleeve and a second circle segment terminating at the bolt, and wherein the first and second circle segments are configured differently.

18. The dynamometer element of claim 17, wherein the first circle segment has a smaller radius than the second circle segment.

19. The dynamometer element of claim 17, wherein the circle segments have a parabolic or spline shape.

20. The dynamometer element of claim 1, wherein annularly shaped joints connect the diaphragm to the sleeve and to the bolt, the diaphragm having an annular shape.

21. The dynamometer element of claim 1, wherein the diaphragm is made of a high-strength steel.

22. The dynamometer element of claim 1, wherein the dynamometer element is substantially axially symmetric.

23. A dynamometer element, comprising:
   a bolt on which the diaphragm is mounted;
   a sleeve to which an outer area of the diaphragm is connected, and to which a force component to be measured is applied perpendicularly to a longitudinal axis of the bolt, a space separates the sleeve from the bolt, the application of the force component reducing the space and thereby straining the diaphragm; and
   a sensor system for measuring the strain, the sensor system being arranged on the diaphragm.

* * * * *